United States Patent Office 3,376,446
Patented Apr. 2, 1968

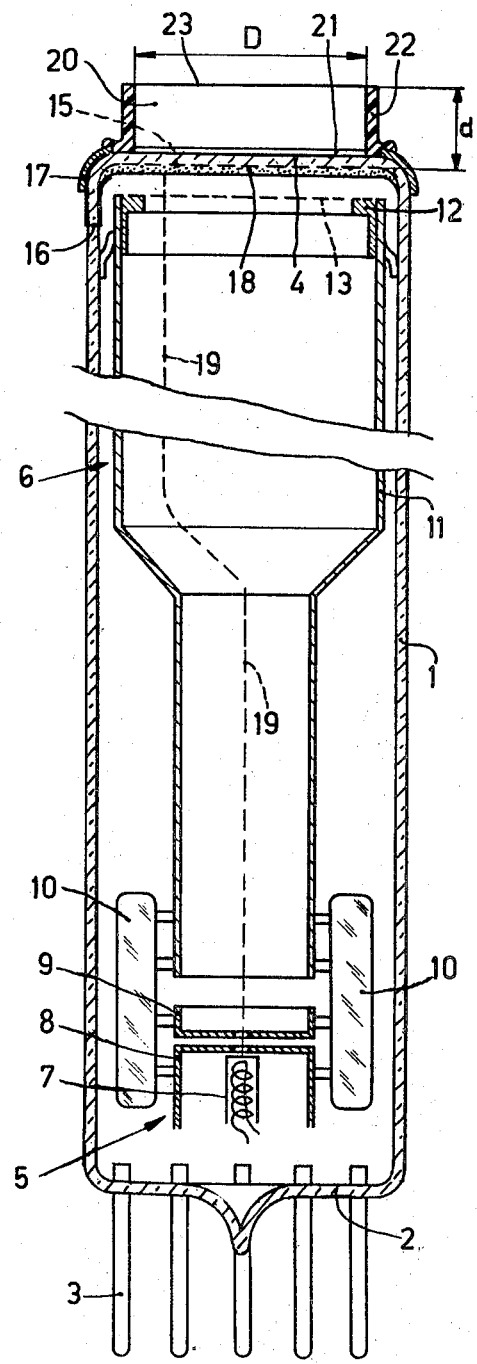

3,376,446
TELEVISION CAMERA TUBE EMPLOYING A PHOTO-SENSITIVE TARGET WITH A TRANSPARENT MEMBER FOR ABSORBING REFLECTED LIGHT FROM THE TARGET
Edward Fokko de Haan and Johan Haantjes, Emmasingel, Eindhoven, Netherlands, assignors to North American Philips Company, Inc., New York, N.Y., a corporation of Delaware
Filed Jan. 7, 1966, Ser. No. 519,370
5 Claims. (Cl. 313—65)

ABSTRACT OF THE DISCLOSURE

A television camera tube employing a photo-sensitive target supported by a glass end wall of a camera tube. A transparent member covered with a light absorbing material about its peripheral surfaces is placed directly in front of, and is bonded to the glass end wall supporting the photo-sensitive target and has a thickness such that light reflected by the target striking the surface of the member remote from the end-wall at the critical angle is reflected toward the peripheral surfaces where it is absorbed thus minimizing spurious light-response by the target.

This invention relates to television camera tubes for converting image-forming radiation in the visible part of the spectrum into electrical signals, comprising a transparent glass end wall provided on its inner surface with a photosensitive layer, and is of particular importance in connection with camera tubes of the vidicon type, i.e. camera tubes wherein the photosensitive layer is a photoconductive layer, the surface thereof remote from the glass end wall being adapted to be scanned by an electron beam generated by an electron gun mounted in said tube.

In viewing color television images it may often be observed that some particular areas of the image may present an unnatural hue akin to the color of an adjacent, differently coloured area of not too small dimensions. This effect, which is most easily observed in connection with flesh-colored areas is the more disturbing, the more the color rendition of the image approaches reality. In black-and-white television a similar effect in the form of graying may be observed, but generally, unless high light-level spots are present, this effect is less troublesome. By raising the black level the observability of this discoloring effect may be decreased, but then the rendition of the white areas is impaired.

The fact that such unnatural hue seemed to occur more strongly when vidicon tubes comprising a photoconductive layer consisting substantially of lead monoxide, in particular comprising for a substantial part the tetragonal, red modification thereof were employed, whereas such tubes were otherwise found to be particularly suited for faithful color rendition in color television techniques, led the inventors to surmise, that perhaps the said effect might be due to malation or halo-forming, i.e. spurious light by internal reflection in the glass end wall of the tube. That with a vidicon comprising a lead monoxide photoconductive layer the hue effect was more pronounced, could then easily be explained by the fact that such lead monoxide layer, when viewed through the glass end wall of the tube under normal daylight conditions presents a more or less vivid orange-red appearance, indicating that especially in this part of the visible spectrum said layer reflects a not inconsiderable part of the light received by said layer.

Halo-forming is well-known is photography and has twenty and even more years ago also been observed in cathode-ray tubes for picture reproduction, where a scanning electron beam strikes a luminescent screen provided on a glass end wall of the tube, the light from the resulting luminescent spot where it strikes the outer surface of said wall at angles near or exceeding the critical angle of total reflection being reflected back towards the screen and giving rise to a circle of light, called the halo circle, surrounding the luminescent spot. At that time various suggestions have been made to overcome halo-forming in such cathode-ray tubes, but most, if not all of them have not found acceptance in practice. One of these suggestions comprised the optical thickening of the glass end wall, either by providing the tube with a sufficiently thick end wall or by providing on the outside of the end wall a relatively thick layer of a material having an index of refraction not much different from that of the glass of which the said end wall is made. Such additional layer might be constituted by a transparent liquid or a plate or the like of solid transparent material, such as glass or plastic.

The above mentioned surmise of the inventors has proved to be correct and in accordance therewith the present invention resides in the reduction of halo-effects in the glass end wall of television camera tubes in a, in this instance for actual practice, completely acceptable way by means of a sufficient increase in the thickness of the optical material in front of the photosensitive layer.

According to the invention a television camera tube for converting image-forming radiation in the visible part of the spectrum into electrical signals, comprising a transparent glass end wall provided on its inside surface with a photosensitive layer is characterized in that a blank of transparent solid is bonded to the outside surface of said glass end wall is provided which covers and covering in projection a substantial part of said photosensitive layer. This blank is provided around the periphery thereof with a light absorbing material. The combined thickness of said glass end wall and said blank is such that light entering the tube through said blank and said glass end wall and reflected by said photosensitive layer and incident on the surface of said blank remote from said glass end wall at angles approaching the critical angle of total reflection is reflected by said surface in directions intercepted by the peripheral surface of said blank.

The invention is particularly useful in overcoming unnatural hue effects when employing camera tubes comprising a photoconductive lead monoxide target. Accordingly in accordance with the invention in a preferred embodiment thereof the blank is bonded to the outside surface of the glass end wall of a tube of the vidicon type, said tube comprising on the inside surface of said end wall a photoconductive layer consisting substantially of tetragonal, red lead monoxide and presenting in normal daylight a red-orange appearance.

The invention will be more readily understood by referring to the following description taken in connection with the accompanying drawing, the latter showing schematically a longitudinal section of an example of a television camera tube according to the invention in the form of a tube of the vidicon type.

The television camera tube illustrated with the single figure of the drawing comprises an evacuated cylindrical glass tube 1 closed at one end by a glass bottom 2 and at the other end by a plane glass end wall 4. In the bottom 2 electrical connecting pins 3 are inserted, which inside the tube are connected with the various elements of an electron gun system 5 and an electrode structure 6. The electron gun system 5 comprises an indirectly heated cathode 7, a control electrode 8 and a perforated anode 9. The electrode structure 6, which constitutes a second anode, comprises a hollow, mainly cylindrical portion 11, which at the end adjacent the glass end wall 4 is provided with a conductive ring 12 to which a mesh electrode 13 is secured. The various elements of the electron gun system 5 and the second anode 11 are maintained in mutually aligned relationship by means of glass supporting members 10.

The inside surface of the end wall 4 is provided with a thin transparent electrode 15, constituting the signal electrode of the tube. This electrode 15, which, as is well known in the art, may consist of a thin layer of conductive tin oxide, is provided with a platinum connecting wire 16 extending through the cylindrical part 1 of the tube. Outside the tube the wire 16 is connected to a conductive ring-like coating 17, for instance a fired-on silver coating, applied to the part of the tube where the glass end wall 4 merges into the cylindrical part 1.

Inside the tube and extending over the signal electrode 15 applied to the inner face of the glass end wall 4 is provided a photoconductive layer 18 adapted to be scanned by an electron beam 19 focussed upon said layer 18 and generated by the electron gun system 5. The scanning movement and focussing of the electron beam 19 is obtained by means of conventional focussing and scanning coils surrounding the tube 1, which coils are not represented in the figure.

The photoconductive layer 18 consists substantially of lead monoxide (PbO), which for a substantial amount is present in the form of the red, tetragonal modification. The percentage of this red, tetragonal modification in the target layer 18 may be in the neighborhood of 90%. The layer 18 which may exhibit a uniform thickness in the range from 5 to 30, preferably 20 microns, is preferably applied to the inside of the glass end wall 4 by means of condensation of evaporated lead monoxide. Seen through the end wall 4 the layer 18 presents under normal daylight conditions a red-orange appearance, indicating that for this part of the visible spectrum the layer 18 reflects an appreciable amount of the light falling on this layer. The television camera tube so far described is in all essentials similar to the tube manufactured and marketed under the trade-mark "Plumbicon" by N. V. Philips' Gloeilampenfabrieken of Eindhoven, Netherlands. The relatively high reflecting power of the photoconductive layer 18 mentioned above, may with the normal thickness of about 1.2 mm. of the glass end wall 4, give rise to a halo-effect clearly noticeable in the image reproduced from the signals obtained by means of this camera tube. This halo-effect is due to light reflected by the photoconductive layer 18 being, when striking the outside surface of the glass end wall 4 at angles approaching the critical angle of total reflection, reflected towards the photoconductive layer 18. As is well-known, the radius of the halo-circle is $$R = 2h \tan \sin^{-1} \frac{1}{n}$$

wherein $h$ is the thickness of the glass end wall and $n$ is the index of refraction of the glass. For $$n \approx 1.5 \sin^{-1} \frac{1}{n} \approx 45°$$

and consequently $R \approx 2h$. For the above mentioned wall thickness of about 1.2 mm. R is about 2.4 mm., consequently a large amount of the light totally reflected by the front surface of the glass end wall reaches the photoconductive layer again within the picture area, i.e. the area of the photoconductive layer 18 scanned by the electron beam 19, which area in the described tube measures 16 x 12 mm.²

To avoid such troublesome halo-effect at least to a large extent, the tube is provided with a circular disc 20, consisting of transparent glass having an index of refraction of approximately 1.5. This disc 20 is centrally positioned with respect to the end wall 4 and bonded to the front surface thereof by means of a thin layer 21 of clear, transparent bonding material of a kind commonly utilized in bonding together the components of optical lens systems. The layer 21 preferably consists of a bonding material manufactured and marketed under the trademark "Lensbond type M 62" by Summers Laboratories Inc. of Fort Washington, Pa., U.S.A., this material retaining a desirable elasticity under low temperature conditions as may for instance occur when the tube is transported by air by way of the North pole-route. The peripheral surface of the disc 20 and the part of the front surface of the end wall 4 not covered by the disc 20 and the light-impervious ringlike coating 17 has applied thereto a layer 22 of light-absorbing material, such as schoolboard-lacquer or the lacquer commonly utilized in blackening the internal parts of photographic cameras. Preferably the peripheral surface of the disc 20 has been frosted, as for instance by etching. The front surface of the glass disc 20, that is the surface remote from the end wall 4 is provided with a conventional anti-reflection coating 23, which preferably maximally reduce reflection of the light coming from the scene to be televised. The coating may be such that maximum reduction of reflection is obtained for the red, green and blue part of the spectrum respectively for camera tubes intended to be used for obtaining respectively the red, green and blue television signals. The diameter D of the disc 20 has of course to be such that the disc effectively covers the area of the photoconductive layer 18 to be scanned by the electron beam 19, which area measures, as stated above, 16 x 12 mm.². In the embodiment described D is approximately 22 mm. (but may of course be larger), thereby being equal to about three quarters of the internal diameter of the tube 1. The combined thickness $d$ of the disc 20, the bonding layer 21 (which normally may be neglected) and the glass end wall 4 is such that most of the light reflected by the picture area of the photoconductive layer 18 and thereupon by the front surface of the disc 20 does not reach again the photoconductive layer because it is intercepted by the peripheral surface of the disc 20 and absorbed there.

In the described embodiment the thickness of the glass disc 20 is 6 to 7 mms., but of course may quite easily be made larger. It was found that a thickness of 6 mm. was in practice quite satisfactory. As the thickness of the glass end wall 4 is about 1.2 mm., the combined thickness $d$ is about 7.5 mm., meaning that the radius of the halo-circle is about 15 mm., that is nearly equal to the length of the scanned area of the photoconductive layer 18.

The disc 20 is preferably made of clear, that is colorless glass. It will be understood, however, that occasionally the disc may be made of colored glass, whereby said disc may function as an optical filter passing only a given part of the spectrum.

In the above described embodiment the glass disc 20 is of circular shape. It will be understood that a different shape may be employed provided that in projection the disc covers at least the area of the photoconductive layer 18 scanned by the electron beam 19. For instance the disc 20 may, as seen from the front, be rectangular or hexagonal or of some other appropriate shape.

What is claimed is:

1. A television camera tube especially suited for a color television camera comprising an evacuated envelope having a transparent glass end wall, a photo-sensitive layer disposed on said end wall for converting a light pattern incident thereon into an electrical signal upon being scanned by an electron beam and capable of reflecting light incident thereon, a member of transparent solid material adjoining and secured to the exterior surface of said glass end wall the projection of which covers a substantial portion of said photo-sensitive layer, said member being provided around the periphery thereof with a layer of light-absorbing material for absorbing light rays reflected by said photo-sensitive layer, said member and said glass end wall portion each having a given thickness whereby their combined thickness is such that a light ray entering and passing through said member and said glass end wall which is reflected by said photo-sensitive layer and is incident on the surface of said member remote from the glass end wall at an angle approaching the critical angle of total reflection is reflected by said latter surface in a direction in which said reflected ray is intercepted by said light-absorbing material thereby minimizing spurious light-response by said photo-sensitive layer manifesting itself as an undesired variation in hue in the reproduced image.

2. A television camera tube as claimed in claim 1, characterized in that the member is bonded to the exterior surface of the glass end wall of the tube, and that said photo-sensitive layer on the inside surface of said glass end wall is a photo-conductive layer consisting substantially of tetragonal, red lead monoxide presenting in normal daylight a red-orange appearance.

3. A television camera tube as claimed in claim 2, characterized in that the peripheral surface of the member is slightly roughened so as to present, prior to the application of the light absorbing material to said surface a frosted appearance.

4. A television camera tube as claimed in claim 3, characterized in that the surface of the member remote from said glass end wall is provided with a reflection reducing coating.

5. A television camera tube as claimed in claim 1, in which said transparent glass end wall is substantially circular and is provided on its inside surface with a transparent conductive electrode over which is deposited a photoconductive layer consisting substantially of lead monoxide, the surface of said photoconductive layer remote from said glass end wall being adapted to be scanned by an electron beam generated by an electron gun mounted in said tube, the outside surface of said glass end wall having in central position bonded thereto said member which is a transparent, substantially circular disc consisting of a glass having an index of refraction of approximately 1.5, said disc having a diameter not less than two thirds of the diameter of said inside surface of said glass end wall, the peripheral surface of said disc and any outside surface of said glass end wall not covered by said disc being coated with a layer of light-absorbing material, the combined thickness of said glass end wall and said disc being at least equal to one third of the diameter of said disc.

References Cited

UNITED STATES PATENTS

| | | | |
|---|---|---|---|
| 2,312,206 | 2/1943 | Calbick | 178—7.82 |
| 2,346,810 | 4/1944 | Young | 313—92 |
| 2,680,205 | 6/1954 | Burton | 313—92 |
| 2,890,359 | 6/1959 | Heijne | 313—94 |

JAMES W. LAWRENCE, *Primary Examiner.*

V. LAFRANCHI, *Assistant Examiner.*